United States Patent
Chang et al.

(10) Patent No.: US 7,257,660 B2
(45) Date of Patent: Aug. 14, 2007

(54) MEMORY CARD HAVING A PLURALITY OF DIFFERENT INTERFACES

(75) Inventors: Jung Ta Chang, Hsinchu (TW); Ping-Chang Liu, Chu Pei (TW); Gordon Yu, Taipei (TW)

(73) Assignees: C-One Technology Corporation (TW); Pretec Electronics Corporation, Freemont, CA (US)

( * ) Notice: Subject to any disclaimer, the term of this patent is extended or adjusted under 35 U.S.C. 154(b) by 382 days.

(21) Appl. No.: 10/812,471

(22) Filed: Mar. 30, 2004

(65) Prior Publication Data

US 2004/0252566 A1    Dec. 16, 2004

(30) Foreign Application Priority Data

Jun. 11, 2003    (TW) .............................. 92210666 U

(51) Int. Cl.
*H05K 7/10* (2006.01)
(52) U.S. Cl. ...................... 710/301; 710/62; 439/638; 439/61
(58) Field of Classification Search ................ 710/301, 710/62; 361/1; 439/638, 630; 235/492
See application file for complete search history.

(56) References Cited

U.S. PATENT DOCUMENTS

| | | | |
|---|---|---|---|
| 5,625,593 A * | 4/1997 | Kimura ................. | 365/189.05 |
| 6,097,883 A * | 8/2000 | Dell et al. ................... | 710/301 |
| 6,857,038 B2 * | 2/2005 | Liu et al. .................... | 710/301 |
| 6,890,188 B1 * | 5/2005 | Le .............................. | 439/76.1 |
| 6,908,038 B1 * | 6/2005 | Le .............................. | 235/492 |
| 6,984,152 B2 * | 1/2006 | Mowery et al. ............ | 439/638 |
| 7,104,848 B1 * | 9/2006 | Chou et al. ................. | 439/660 |
| 7,149,836 B2 * | 12/2006 | Yu et al. ..................... | 710/301 |
| 2003/0154326 A1 * | 8/2003 | Tseng et al. ................... | 710/1 |
| 2004/0070952 A1 * | 4/2004 | Higuchi et al. ............. | 361/737 |
| 2004/0117553 A1 * | 6/2004 | Kurakata et al. ........... | 711/115 |
| 2004/0182938 A1 * | 9/2004 | Chen et al. ................. | 235/492 |
| 2005/0037647 A1 * | 2/2005 | Le .............................. | 439/131 |
| 2005/0060466 A1 * | 3/2005 | Chen .......................... | 710/301 |
| 2005/0117553 A1 * | 6/2005 | Wang et al. ................. | 370/338 |
| 2005/0273648 A1 * | 12/2005 | Mambakkam et al. ......... | 714/5 |
| 2006/0015673 A1 * | 1/2006 | Morrow ....................... | 710/315 |

* cited by examiner

*Primary Examiner*—Donald Sparks
*Assistant Examiner*—Ernest Unelus
(74) *Attorney, Agent, or Firm*—Bacon &Thomas, PLLC

(57) ABSTRACT

A memory card having a plurality of different interfaces is disclosed. The memory card comprises a function module, a controller coupled to the function module for accessing, a first buffer coupled to the controller for sending a first control signal, and a second buffer coupled to the controller for sending a second control signal. The memory card activates one interface for detecting a first voltage level of the first buffer when the memory card is inserted into a first card reader, and the first buffer is activated to send the first control signal if the detection is positive. Alternatively, the memory card activates the other interface for detecting a second voltage level of the second buffer when the memory card is inserted into a second card reader, and the second buffer is activated to send the second control signal if the detection is positive.

6 Claims, 4 Drawing Sheets

MEMORY CARD HAVING A PLURALITY OF DIFFERENT INTERFACES

BACKGROUND OF THE INVENTION

1. Field of the Invention

The present invention relates to memory cards and, more particularly, to a memory card having a plurality of different interfaces.

2. Description of Related Art

Electronics technology has gone through a rapid, spectacular development leading to a blooming of a variety of portable electronic products such as notebook computers, palm computers, PDAs (Personal Digital Assistants) or the like. Such portable electronic products bring a great convenience to users. Also, an adapter such as a network card or modem card can be mounted for enhancing features of the product. Moreover, a memory card can be used to store data in the above products. Further, a memory card can be used to store data in a consumer electronic product such as digital camera, MP3 (MPEG Layer 3) player or the like.

Conventionally, two types of memory cards are being widely used. Namely, a SD (Secure Digital) card and a MS (Memory Stick) card. In addition to data storage, the SD card is able to provide data encryption and features 3 unique characteristics, i,e, high capacity, low power consumption, and write protection for preventing data deletion be accident. MS cards are developed by SONY corperation. The MS cards are widely employed in products produced by SONY corperation. The MS card also features advantages such as high capacity, low power consumption or the like.

As shown in FIG. 1, in a case of inserting a SD card 22 into a SD card reader 20, the SD card reader 20 performs a SD protocol to read data from the SD card 22. In another case of inserting a MS card 32 into a MS card reader 30, the MS card reader 30 performs a MS protocol to read data from the MS card 32. In addition, a demand of the quality of both the portable electronic products including memory cards, and the consumer electronic products has been increasing as they are available in an even faster pace. However, the various memory cards are not compatible with one another, it is impossible to read data via inserting one format memory card such as SD card 22 into another format card reader such as MS card reader 30. This is really inconvenient. Thus, the need for improvement still exists.

SUMMARY OF THE INVENTION

An object of the present invention is to provide a memory card having a plurality of different interfaces so as to be connectable to a portable electronic device incorporating one of the interfaces.

To achieve the above and other objects, the present invention provides a memory card having a plurality of different interfaces, comprising a function module; a controller coupled to the function module for accessing; a first buffer coupled to the controller for sending a first control signal, the first buffer including a first resistor for providing a first voltage level; and a second buffer coupled to the controller for sending a second control signal, the second buffer including a second resistor for providing a second voltage level, wherein the memory card activates one of the interfaces for detecting a first voltage level of the first buffer when the memory card is inserted into a first card reader, and the first buffer is activated to send the first control signal if the detection of the first voltage level of the first buffer is positive; or the memory card activates the other interface for detecting a second voltage level of the second buffer when the memory card is inserted into a second card reader, and the second buffer is activated to send the second control signal if the detection of the second voltage level of the second buffer is positive. By utilizing the memory card of the present invention as either SD card or MS card, it is possible to connect the memory card to any of the portable and consumer electronic products.

Other objects, advantages, and novel features of the invention will become more apparent from the detailed description when taken in conjunction with the accompanying drawings.

DETAILED DESCRIPTION OF THE PREFERRED EMBODIMENT

Figure 1:
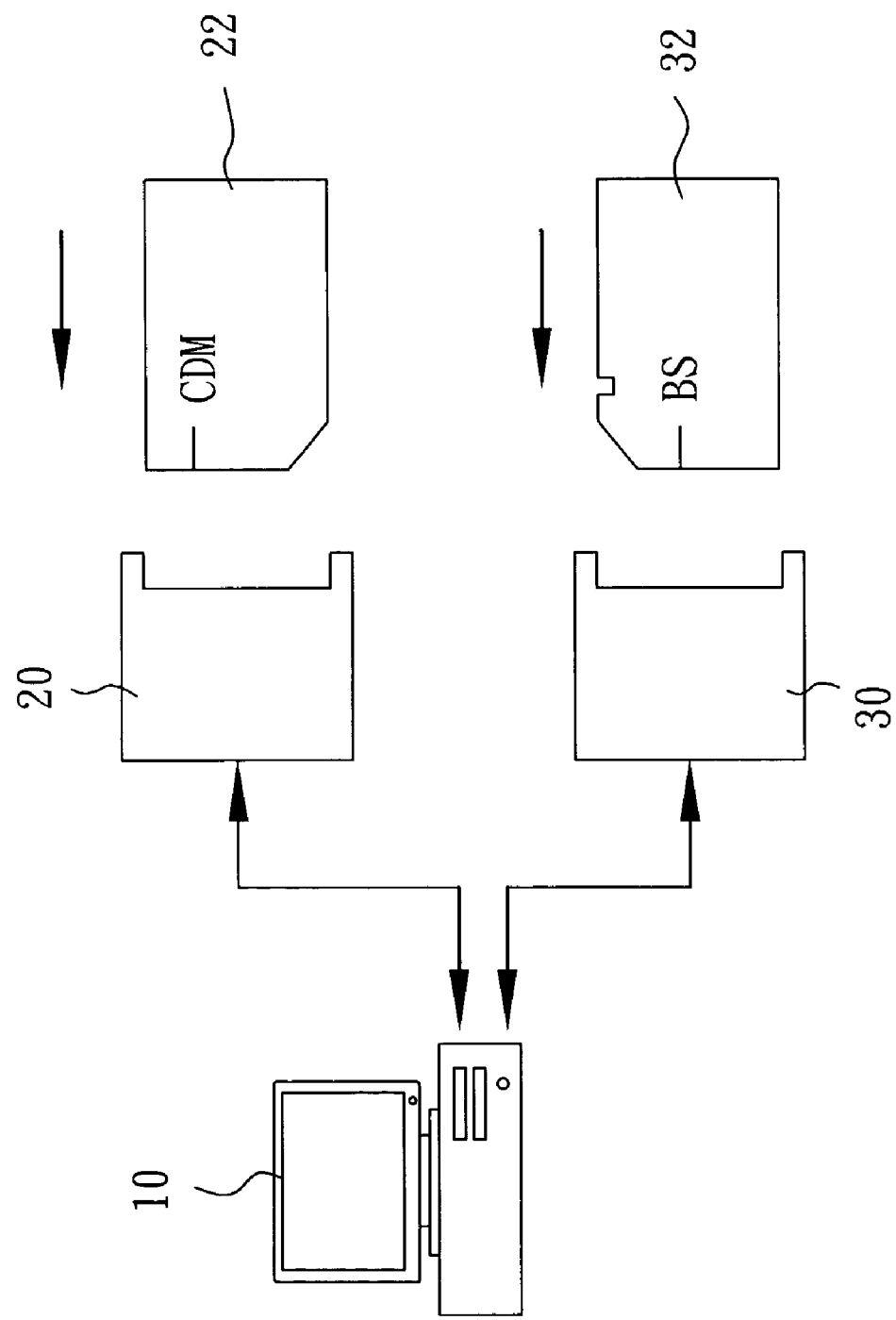
FIG. 1 schematically diagram of a prior art memory cards and card readers.
Figure 2:
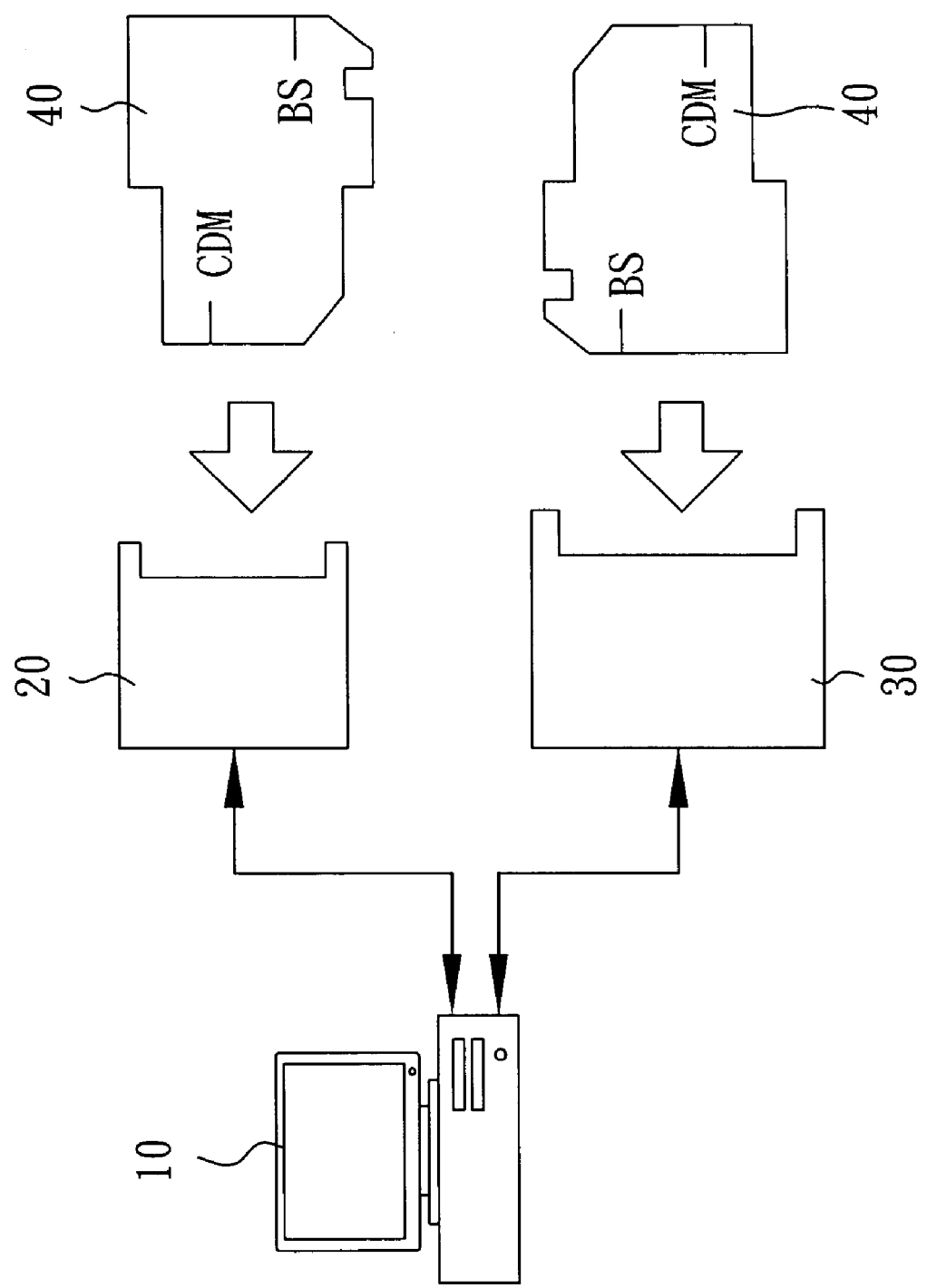
FIG. 2 schematically diagram of a memory card having a plurality of metal pads in accordance with the invention and card readers.

With reference to FIG. 2, a memory card 40 constructed in accordance with the invention is shown. The memory card 40 has a plurality of interfaces such as an interface of SD protocol and an interface of MS protocol. In a case of inserting the memory card 40 (served as a SD card) into a SD card reader 20, the SD card reader 20 performs a SD protocol to read data from the memory card 40. In another case of inserting the memory card 40 (served as a MS card) into a MS card reader 30, the MS card reader 30 performs a MS protocol to read data from the memory card 40.

Pin assignments of the MS and the SD cards are described in the following table.

| MS card | | SD card | |
| --- | --- | --- | --- |
| Pin | function | pin | Function |
| 9 | Vcc | 4 | Vcc |
| 2 | CLK | 2 | CLK |
| 8 | BS | 5 | CMD |
| 1, 6, 10 | Vss | 3, 6 | Vss |
| 4 | Data0 | 7 | Data0 |
| 3 | Data1 | 8 | Data1 |
| 5 | Data2 | 9 | Data2 |
| 7 | Data3 | 1 | Data3 |
| | | 10 | INS |

Data0, Data1, Data2, and Data3 are used to transfer data. Vcc is coupled to a positive terminal of a power source. Vss is coupled to a negative terminal of the power source. CLK is coupled to a clock signal. CMD and BS are used to transmit control/status signals. INS is used to detect whether a SD card has been inserted into the SD card reader 20. Also, INS is coupled to the negative terminal of the power source when the memory card 40 is implemented as a SD card. In is known that functions of both the SD card and the MS card are the same except the following: Pin 5 of the SD card is coupled to CMD signal and has an initial high voltage level. Pin 8 of the MS card is coupled to BS signal and has an initial low voltage level. Thus, the SD card reader 20 or the MS card reader 30 can correctly read data from the memory card 40 if the memory card 40 served as either a SD card or a MS card can detect different voltage levels of the SD card reader 20 and the MS card reader 30. For instance, the memory card 40 will perform a SD protocol to communicate with the SD card reader 20 if the memory card 40 detects a high voltage level of the SD card reader 20. On the contrary, the memory card 40 will perform a MS protocol to communicate with the MS card reader 30 if the memory card 40 detects a low voltage level of the MS card reader 30. By utilizing the memory card 40 (having two different interfaces e.g., interface of SD protocol and interface of MS protocol) as either a SD card or MS card, it is possible of connecting the memory card 40 to one of a variety of portable and consumer electronic products.

Figure 3:
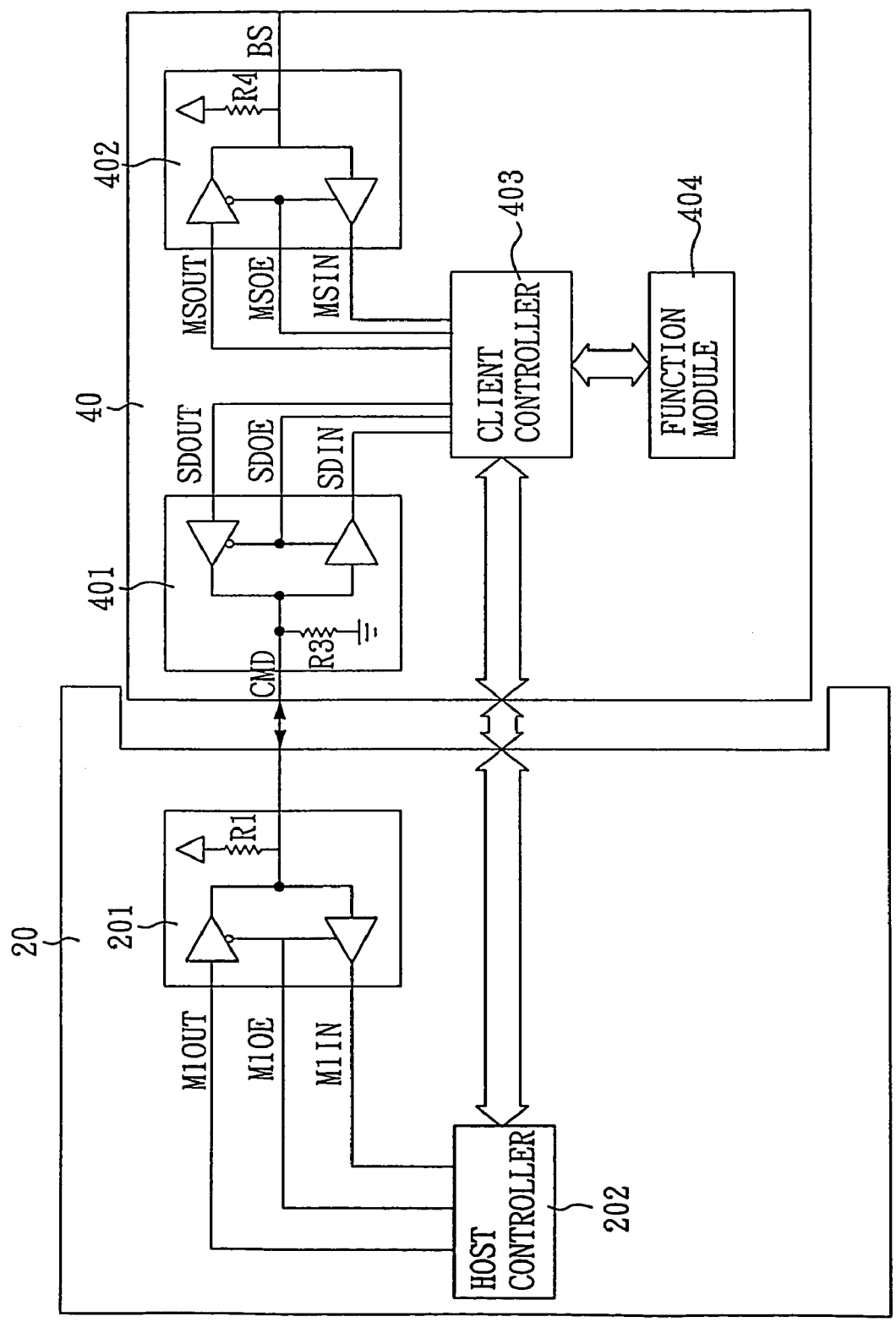
FIG. 3 is an block diagram of the memory card having a plurality of metal pads in accordance with the invention and a card reader.

With reference to FIG. 3, the memory card 40 comprises a SD input/output (I/O) buffer 401 for CMD control signal I/O, the SD I/O buffer 401 including a pull-down resistor R3 such as 500 kΩ, a MS I/O buffer 402 for BS control signal I/O, the MS I/O buffer 402 including a pull-up resistor R1 having a resistor value ranged from 5 kΩ to 50 kΩ, a slave controller 403, and a function module 404 formed of flash memory. The SD card reader 20 comprises a SD I/O buffer 201 including a pull-up resistor R1 such as 5 kΩ, and a master controller 202.

In a case of inserting the memory card 40 into the SD card reader 20, a pin SDOE of the slave controller 403 is enabled to detect the voltage level of a pin SDIN. The pin SDIN is at a high voltage level since the resistor R3 is coupled to ground. The slave controller 403 determines that the card reader is a SD card reader 20 prior to enabling a bus of the SD interface and communicating CMD control signal with the master controller 202. As such, the master controller 202 can control the slave controller 403 by means of CMD control signal prior to accessing to the function module 404. In response to inserting the memory card 40 into the SD card reader 20, the SD card reader 20 outputs data signals via Data0, Data1, Data2, and Data3, power signals via Vcc and Vss, and clock signals via CLK respectively in cooperation with CMD control signal.

Figure 4:
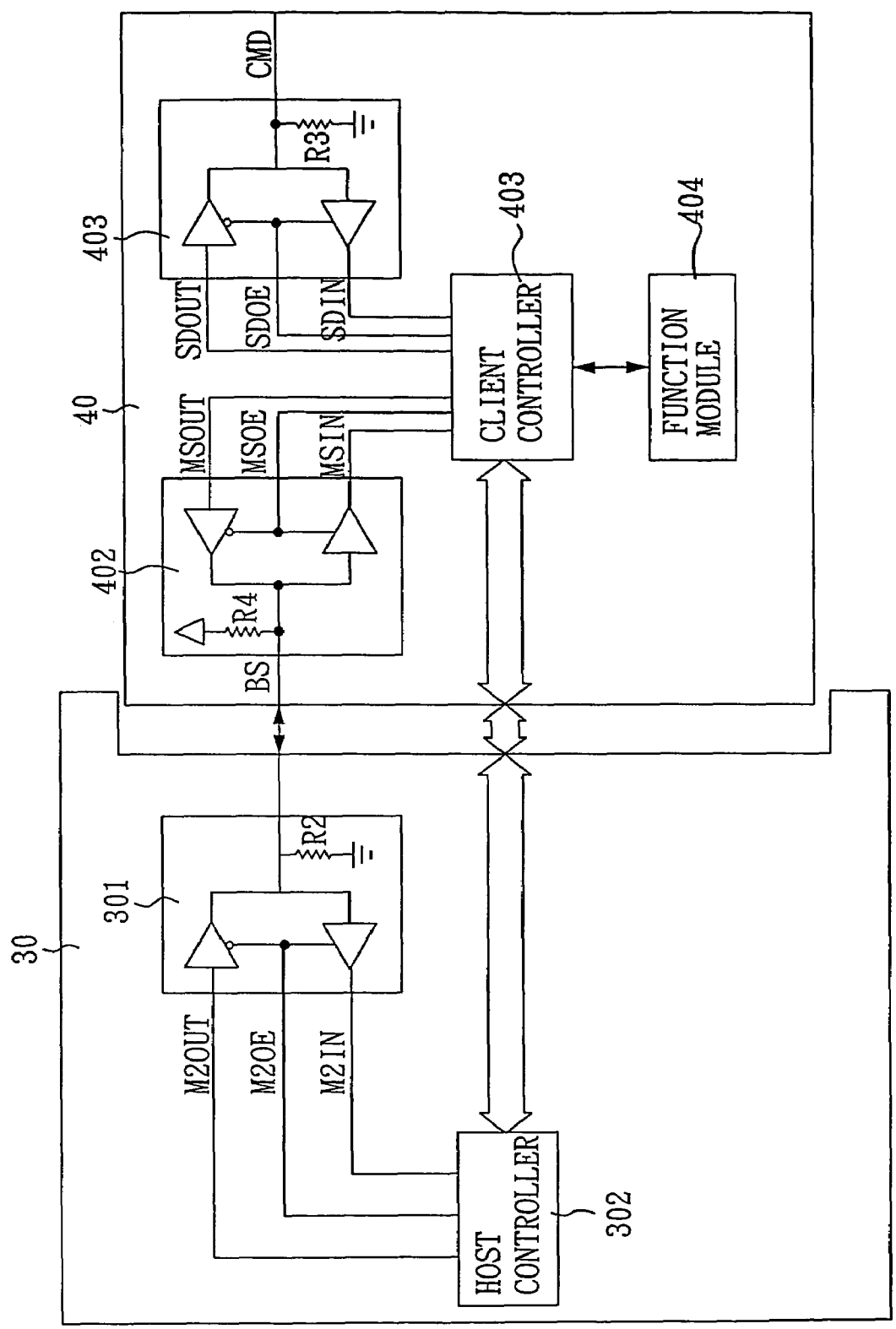
FIG. 4 is an block diagram of the memory card having a plurality of metal pads in accordance with the invention and another card reader.

With reference to FIG. 4, the memory card 40 is served as a MS card. The MS card reader 30 comprises a MS I/O buffer 301 including a pull-down resistor R2 having a resistor value ranged from 5 kΩ to 50 kΩ, and a master controller 302. Also, a pull-up resistor R4 of 500 kΩ is coupled to the BS pin.

In another case of inserting the memory card 40 into the MS card reader 30, a pin MSOE of the slave controller 403 is enabled to detect the voltage level of a pin MSIN. The pin MSIN is at a low voltage level since the resistor R2 is coupled to ground. The slave controller 403 determines that the card reader is a MS card reader 30 prior to enabling a bus of the MS interface and communicating BS control signal with the master controller 302. As such, the master controller 302 can control the slave controller 403 by means of BS control signal prior to accessing to the function module 404.

In response to inserting the memory card 40 into the MS card reader 30, the MS card reader 30 outputs data signals, power signals, and clock signals respectively in cooperation with BS control signal.

The memory card 40 can also be implemented as one having the features of either a MMC (Multimedia card) or MS card since the MMC has a similar structure as the SD card or the MS card.

Although the present invention has been explained in relation to its preferred embodiment, it is to be understood that many other possible modifications and variations can be made without departing from the spirit and scope of the invention as hereinafter claimed.

What is claimed is:

1. A memory card having a SECURE DIGITAL (SD) interface at one end and a MEMORY STICK (MS) interface at the opposite end for communicating with an SD card reader and an MS card reader respectively, comprising;
   a function module;
   a controller coupled to the function module for accessing;
   an SD I/O buffer coupled to the controller for sending a command (CMD) control signal, the SD I/O buffer including a first pull-down resistor for providing a first voltage level to the CMD control signal; and
   an MS I/O buffer coupled to the controller for sending a bus status (BS) control signal, the MS I/O buffer including a first pull-up resistor for providing a second voltage level to the BS control signal,
   wherein, when the memory card is inserted into an SD card reader having a second pull-up resistor, the first pull-down resistor and the second pull-up resistor are coupled to provide the CMD control signal with a high voltage level, wherein the controller determines that the memory card is inserted into an SD card reader and thus enables the SD interface for communicating with the SD card reader, and
   wherein, when the memory card is inserted into an MS card reader having a second pull-down resistor, the first pull-up resistor and the second pull-down resistor are coupled to provide the BS control signal with a low voltage level, wherein the controller determines that the memory card is inserted into an MS card reader and thus enables the MS interface for communicating with the MS card reader.

2. The memory card as claimed in claim 1, wherein the function module is formed of flash memory.

3. The memory card as claimed in claim 2, wherein the first pull-down resistor has a resistance of 500 kΩ.

4. The memory card as claimed in claim 3, wherein the second pull-up resistor has a resistance of 5 kΩ.

5. The memory card as claimed in claim 2, wherein the first pull-up resistor has a resistance in the range of 5 kΩ to 50 kΩ.

6. The memory card as claimed in claim 5, wherein the second pull-down resistor has a resistance in the range of 5 kΩ to 50 kΩ.

* * * * *